Oct. 6, 1925.

G. HANSON ET AL 1,556,438

CONVEYING APPARATUS

Filed Feb. 14, 1922

Inventors.
Gustave Hanson.
Charles A. Nelson.
Arthur B. Jenkins.
Attorney.

Patented Oct. 6, 1925.

1,556,438

UNITED STATES PATENT OFFICE.

GUSTAVE HANSON AND CHARLES A. NELSON, OF EAST BERLIN, CONNECTICUT, ASSIGNORS, BY DIRECT AND MESNE ASSIGNMENTS, TO LANCASTER IRON WORKS, OF LANCASTER, PENNSYLVANIA, A CORPORATION OF PENNSYLVANIA.

CONVEYING APPARATUS.

Application filed February 14, 1922. Serial No. 536,570.

*To all whom it may concern:*

Be it known that we, GUSTAVE HANSON and CHARLES A. NELSON, each a citizen of the United States, and residents of East Berlin, in the county of Hartford and State of Connecticut, have invented a new and Improved Conveying Apparatus, of which the following is a specification.

Our invention relates to devices used more especially in connection with conveyors of the endless belt type, and an object of our invention, among others, is to provide a device by means of which both the upper and lower parts of an endless belt or conveyor may be made use of for transportation purposes.

One form of device embodying our invention and in the construction and use of which the objects herein set out, as well as others, may be attained, is illustrated in the accompanying drawings, in which—

Figure 1:
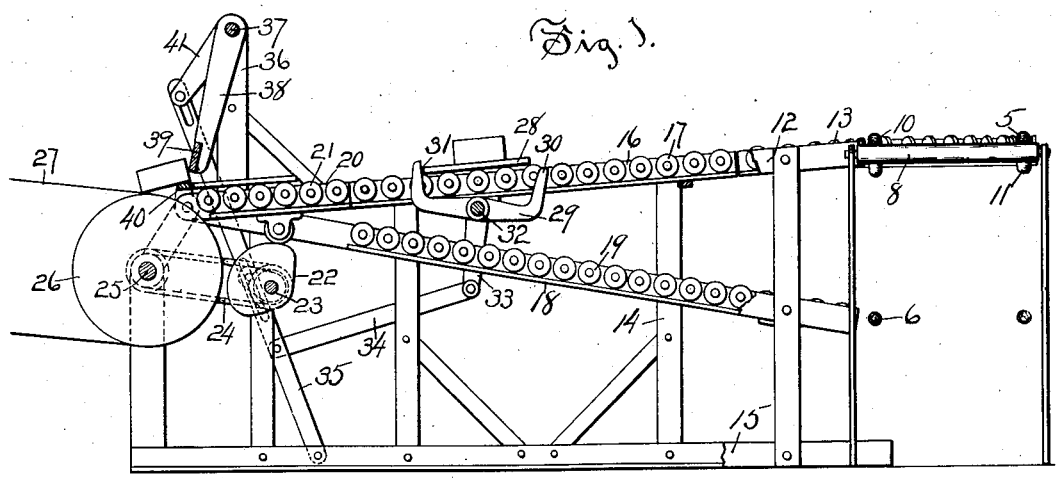
Figure 1 is a view of our improved conveying apparatus, broken away and cut in vertical section.

While our invention is not limited in its use to any particular purpose, yet a good illustration of an instance in which it will find ready application is that of an endless conveyor used for transporting pallets loaded with bricks from one point to another, as from the drying shelves to the baking ovens, and such a device has, therefore, been selected by us for the purpose of disclosing our invention herein.

In the accompanying drawings there is illustrated an endless conveyor which may be considered as arranged for the transportation of bricks upon pallets from the drying racks or shelves, this conveyor comprising the usual upper reach 5 and lower reach 6 that may be a pair of endless cables supported at their ends upon rollers in the ordinary manner and an illustration of which is unnecessary herein, the pallets resting at their opposite ends on the two lengths of cable. At a point where it is desired to divert the pallets from this belt or conveyor a "ducking" device is arranged, which device embodies ducking rollers 7—8 one located above and the other below the upper reach of the conveyor and in contact therewith so that the conveyor is pressed downwardly by the roller 7 to locate the part 10 of the conveyor above the part 11, the part 10 being located substantially in the plane of the upper sides of rollers of a diverting frame comprising side parts 12 arranged in the form of a curve and having diverting rollers 13 pivotally secured thereto, this frame being supported in any suitable manner, and as it is of well known construction further illustration and description are omitted herein, as its arrangement and operation will be readily understood by those skilled in the art.

Our invention comprises means for transferring devices from one reach of the conveyor, by which such devices are carried in one direction, to the other reach of the conveyor, by means of which said devices are carried in the opposite direction, in the special arrangement illustrated and described herein these devices being transferred from the upper reach of the conveyor to the lower reach thereof, although it will be understood that we do not limit ourselves to such arrangement. The invention also comprises means for unloading bricks from pallets, the latter being the devices illustrated herein as being redelivered to the conveyor comprising the members 5 and 6.

This transferring mechanism comprises a frame including uprights 14 secured to and supported by side parts 15 of a base, all of which parts may be braced and strengthened in any suitable manner. The mechanism includes a "go" section and a return section and the "go" section comprises a stationary and pivoted member. The stationary member of the "go" section is composed of side rails 16 secured to the upper ends of the uprights 14 and having rollers 17 secured to said side parts. The return section is composed of side rails 18 secured to the uprights below the rails 16, the side rails in both sections being inclined downwardly in the direction of movement of the devices thereon. Rollers 19 are pivotally secured to the side rails 18 and the frame of the pivoted member of the "go" section of the apparatus is pivotally attached to the side rails 18, and comprises side rails 20 having rollers 21 pivotally attached thereto. This pivoted member is operated by means of a returning cam or cams 22 secured to a cam shaft 23 suitably supported in the frame of the machine and which cam shaft may be driven as by means of a sprocket chain 24 from the shaft 25 of a roll 26 of an endless conveyor 27 to which material is delivered from the transferring and returning mechanisms and as clearly shown in Figure 1 of the drawings, and it may be understood that in the device, as herein equipped, the endless conveyor 27 will conduct bricks to the ovens in which they may be placed when removed from the conveyor.

Figure 2:
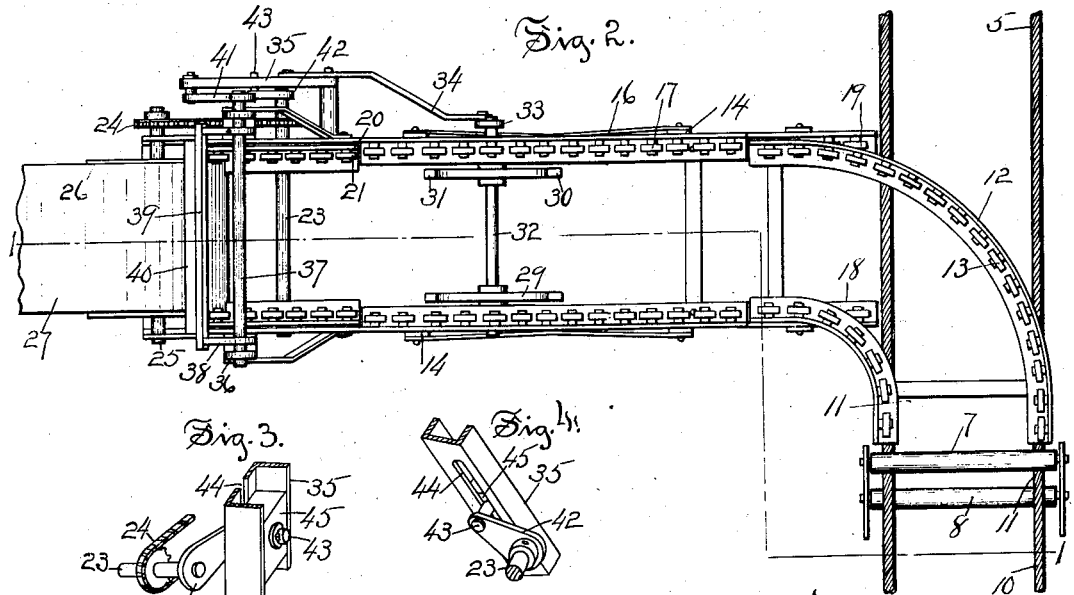
Figure 2 is a top view of the same.
Figure 3:
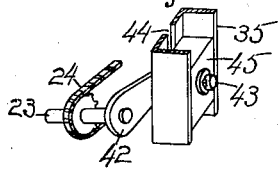
Figures 3 and 4 are perspective fragmentary views illustrating the construction and operation of the sweep mechanism.
Figure 4:
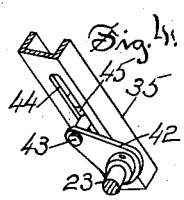

Pallets 28 travel over the rollers 17 under the influence of gravity, their movement being regulated by a controller comprising rockers 29 having holding fingers 30 and releasing fingers 31 adapted to project upwardly into the path of movement of the pallets over the rollers 17. The rockers 29 are secured to a rock shaft 32 having an arm 33 secured thereto and connected by a pitman 34 with a lever 35 pivotally attached at its lower end to a base rail 15. The fingers 30 and 31 are so arranged that they are alternately projected into the path of movement of the pallets over the rollers 17, operating similarly to a clock escapement, and by the arrangement, as will be readily understood, a single pallet only is permitted to travel to the pivoted section of the apparatus at a time, the other pallets being held by the fingers 30 while the pallet in advance is traveling to said pivoted section for delivery to the return section of the apparatus, it being observed that the movements of the controller are timed with those of the cam 22 to deliver a pallet to said pivoted section after the return of said section to its position in line with the "go" section of the apparatus. While a single controller may answer the purpose above described, yet we prefer to use and have illustrated herein a pair of such controllers, as clearly shown in Figure 2 of the drawings.

Posts 36 are secured to and rise from the side parts of the frame to support a sweeper shaft 37 rotatably mounted in bearings on said posts and having sweeper arms 38 provided at their outer ends with a sweep 39 so located that in the oscillation of the shaft 37 the sweep will push the bricks from the pallet located on the pivoted section of the apparatus, and while said pallet rests against a stop 40, across the top of such stop and onto the conveyor 27. The shaft 37 is oscillated as by means of an arm 41 pivotally connected with the upper end of the lever 35. This lever is oscillated as by means of a crank arm 42 secured to the shaft 23 and having a crank pin 43 passing through a slot 44 in the lever 35 and into a guide block 45 having a reciprocating movement within a channel in the lever 35, the lever being constituted of channel iron and thus providing a channel to receive said block.

In the operation of the device it will be noted that a pallet containing brick when reaching the ducking rollers will pass on to the rollers of the diverting frame, by means of which said pallet will be carried from the upper reach 5 of the conveyor in a direction at right angles thereto and as will be readily understood. This conveyor is inclined downwardly to a slight degree and the pallets thus pass onto the rollers 17, the inclination of the frame of which causes them to travel toward the conveyor 27. The fingers 30 and 31 are located a distance apart substantially equal to the width of the pallets, and the latter are so formed as to provide space into which the fingers 30 may pass and thus hold all of the pallets at this end of the frame against movement, while the fingers 31 permit the pallet in advance to travel along the rollers to the pivoted section of the apparatus and against the stop 40. At this time the sweep 39 will operate to move the bricks from the pallet on to the conveyor 27 and immediately thereafter the cam 22 will permit the pivoted section to drop, as to one end thereof, and the now empty pallet will travel through the opening in the "go" section of the frame and onto the inclined surface of the return section of the lower reach 6 of the conveyor by means of which the pallets will be returned to any convenient point.

In accordance with the provisions of the patent statutes we have described the principles of operation of our invention, together with the device which we now consider to represent the best embodiment thereof; but we desire to have it understood that the device shown is only illustrative and that the invention may be carried out by other means.

We claim—

1. A conveying apparatus including an endless conveyor, means for automatically removing matter from one reach of said conveyor, means for separating said matter, and means for automatically delivering a portion of said matter to the other reach of said conveyor.

2. A conveying apparatus including two sections of a one-piece conveyor, each of said sections traveling in opposite directions, means for automatically removing matter from one of said members, means for separating said matter, and means for returning part of said matter to the other of said members.

3. A conveying apparatus including an endless conveying member, means for automatically removing matter from one reach of said conveying member, means for automatically separating said matter, and means for automatically returning a portion of said matter to the upper surface of the other reach of said conveying member to be supported and carried thereby.

4. A conveying apparatus comprising means for conveying matter in one direction, and having a portion traveling in the opposite direction, means for separating said matter, and means for delivering said separated matter to the upper surface of that part of said conveyor traveling in said opposite direction, said separated matter being supported and carried by said last mentioned part of said conveyor.

5. A conveying apparatus comprising a conveyor member for conveying matter in one direction, a tilting member to receive said matter, means for separating said matter, means for tilting said member to start movement of said matter in the opposite direction, and means comprising said conveyor member for conveying said matter in said opposite direction.

6. A conveying apparatus comprising a section for conveying receptacles in one direction and including a tilting section, a section for conveying the said receptacles in another direction, means for removing matter from said receptacles on said tilting member, and means for tilting said section to deliver said receptacles from the first named section to the last named section to be supported and carried thereby.

7. A conveying apparatus comprising a section for conveying receptacles in one direction, a tilting member included in said section, a section for conveying the said receptacles in another direction, a sweep located above said tilting member to remove matter from said receptacles, and means for tilting said member to deliver said receptacles from the first named section to the last named section.

8. A conveying apparatus comprising a section arranged in an inclined position, conveying rollers rotatably mounted on said section, a tilting member comprising a portion of said section, conveying rollers mounted on said tilting member, a sweep located to remove articles from said tilting member, and a second section embodying conveying rollers to receive matter from said tilting member, said second section being inclined in an opposite direction from that of the other section.

9. A conveying apparatus comprising two sections inclined in opposite directions to permit unrestricted movement of articles therealong, means for regulating the movement of articles along one of said sections, means for transferring articles from one of said sections to the other, and means for operating said transferring means and operatively connected with said regulating means.

10. A conveying apparatus comprising two sections inclined in opposite directions, a rocker comprising two spaced members for regulating the movement of articles along one of said sections, means for transferring articles from one of said sections to the other, and means for operating said transferring means and operatively connected with said rocker whereby the movement of the rocker and transferring means are timed one with respect to the other.

11. A conveying apparatus comprising an inclined section, means for regulating the movement of matter along said section, a stop to receive said matter after passing said regulating means, means for separating said matter while acted upon by said stop, and means for moving a portion of said matter away from said stop.

12. A conveying apparatus comprising an inclined section, a tilting member comprising a portion of said section, a stop to receive articles traveling along said section, a sweep to remove matter from said articles while acted upon by said stop, and means for operating said tilting section to move the articles away from said stop.

13. A conveying apparatus comprising an inclined section, a tilting member comprising a portion of said section, a sweep to remove articles from receptacles while on said tilting member, means for operating said tilting member, and means for operating said sweep, said operating means being connected to operate the sweep and tilting member in timed relation one with respect to the other.

14. A conveying apparatus comprising an inclined section, a tilting member comprising a portion of said section, a sweep to remove articles from receptacles while on said tilting member, means for regulating movement of receptacles along said inclined member, means for operating the sweep, means for operating the tilting member, and means for operating said regulating means, all of said operating means being connected whereby timed operation of each with another is effected.

GUSTAVE HANSON.
CHARLES A. NELSON.